United States Patent [19]

Hama

[11] Patent Number: 5,621,562
[45] Date of Patent: Apr. 15, 1997

[54] OPTICAL SCANNING DEVICE

[75] Inventor: Yoshihiro Hama, Tokyo, Japan

[73] Assignee: Asahi Kogaku Kogyo Kabushiki Kaisha, Tokyo, Japan

[21] Appl. No.: 547,204

[22] Filed: Oct. 24, 1995

[30] Foreign Application Priority Data

Oct. 27, 1994 [JP] Japan .................................. 6-287387

[51] Int. Cl.⁶ .................................................. G02B 26/08
[52] U.S. Cl. ........................ 359/207; 359/208; 359/216; 359/217; 359/218; 250/236
[58] Field of Search .................................... 359/207–208, 359/216–219; 250/234–236; 347/258–261; 358/296, 302, 474

[56] References Cited

U.S. PATENT DOCUMENTS

| | | |
|---|---|---|
| 4,054,361 | 10/1977 | Noguchi .................. 359/208 |
| 5,134,513 | 7/1992 | Morimoto . |
| 5,194,982 | 3/1993 | Morimoto . |
| 5,218,461 | 6/1993 | Aoyama et al. . |
| 5,299,050 | 3/1994 | Morimoto et al. . |
| 5,408,095 | 4/1995 | Atsuumi et al. . |
| 5,452,119 | 9/1995 | Morimoto et al. . |
| 5,506,719 | 4/1996 | Murakami et al. .............. 359/218 |

FOREIGN PATENT DOCUMENTS 6-265810  9/1994  Japan .

Primary Examiner—James Phan
Attorney, Agent, or Firm—Greenblum & Bernstein P.L.C.

[57] ABSTRACT

In an optical scanning device, a redirecting flat mirror is provided that redirects a laser flux from a laser source to a polygonal mirror. In order to reduce the size of the optical scanning device in the direction in which the optical elements are generally aligned, the flat mirror is placed between the polygonal mirror and a curved surface mirror. Preferably, the polygonal mirror is arranged between the curved surface mirror and an anamorphic lens to further reduce the size. Further, the laser source may be placed between the curved surface mirror and the anamorphic lens.

11 Claims, 4 Drawing Sheets

OPTICAL SCANNING DEVICE

BACKGROUND OF THE INVENTION

The present invention relates to reflection type optical scanners that are used for example in laser beam printers. Recently, the demand for more compact laser beam printers and more compact optical scanning devices for use therein has increased. A conventional reflection type optical scanning device is disclosed in Japanese Patent Provisional Publication HEI 6-265810. As disclosed therein, in an optical scanning device, a laser beam is generated at a laser source pointed at a polygonal mirror, reflected back by the polygonal mirror (towards the laser source and angled upwards) to a cylindrical mirror, and reflected back again (towards the polygonal mirror and again angled upward) to a toric lens and optical path bending mirror. The beam is reflected by the optical path bending mirror toward an imaging drum. In this case, "up" is a sub-scanning direction.

However, in the disclosed optical scanning device, the length of the optical path between the light source and polygonal mirror is straight and relatively fixed, making it difficult to reduce the size of the device. Furthermore, the positioning of the remaining optical elements also makes it difficult to produce a compact scanning device using the conventional arrangement.

SUMMARY OF THE INVENTION

It is therefore an object of the present invention, to provide an improved reflection type optical scanning device that has sufficient optical path length, yet is smaller in the general direction of the optical paths.

In order to achieve the objects of the invention, an improved optical scanning device is provided that includes: a laser source for emitting a laser flux; a first flat mirror for redirecting the laser flux from the laser source; a rotatable polygonal mirror, for scanning the laser flux redirected by the first flat mirror, the scanning laser flux being separated from the redirected laser flux in a sub-scanning direction by a first separation angle $\theta_1$, and the polygonal mirror being separated from the first flat mirror by a first predetermined distance; a curved surface mirror for reflecting the laser flux scanned by the polygonal mirror, and for converging the laser flux scanned by the polygonal mirror in a main scanning direction, the reflected scanning laser flux being separated from the scanning laser flux in the sub-scanning direction by a second separation angle $\theta_2$, and the curved surface mirror being separated from the polygonal mirror by a second predetermined distance greater than the first predetermined distance; and an anamorphic lens for converging the reflected scanning laser flux in the sub-scanning direction. The anamorphic lens may be separated from the curved mirror by a third predetermined distance greater than the first predetermined distance, whereby the laser flux is redirected by the first flat mirror between the polygonal mirror and the curved mirror.

By redirecting the laser flux toward the polygonal mirror in the space between the polygonal mirror and the curved mirror, the laser source may be placed to the side of the optical scanning device, and the size of the device in the "main axis" direction along which the optical elements are generally lined up.

In one preferred embodiment, the anamorphic lens is separated from the curved mirror by a third predetermined distance greater than both of the first and second predetermined distances, whereby the laser beam is received and scanned by the polygonal mirror between the curved mirror and the anamorphic lens. In this manner, the size is further reduced in the "main axis" direction, as both the redirecting flat mirror and the polygonal mirror are placed within the space between the curved surface mirror and the anamorphic lens.

Preferably, the first flat mirror is arranged to redirect the laser beam from the light toward the rotary axis of the polygonal mirror. Accordingly, the size of the polygonal mirror is minimal for the possible sweep of the scanning range, and some distortion is removed.

DESCRIPTION OF THE ACCOMPANYING DRAWINGS

DESCRIPTION OF THE EMBODIMENTS

The device of an embodiment of the invention is an optical scanning device to be used, for example in an laser beam printer.

The printer in which the embodiment is applied operates generally by scanning an electrostatic latent image onto a photoconductive drum 18 by means of a laser beam modulated by an input signal.

Hereinafter, in the context of this specification, the term "main scanning direction" is defined as the direction in which the laser beam deflected by a polygonal mirror 14 scans (i.e., if projected back along the optical path, in a direction that is ultimately parallel to the rotational axis of the photoconductive drum 18 when the beam reaches the drum 18). Furthermore, the "sub-scanning direction" is defined as being perpendicular to the main scanning direction, with reference to the optical of the main scanning beam (i.e., if projected back along the optical path, in a direction that is ultimately tangent to the cylindrical surface of the drum 18 when the beam reaches the drum 18).

Figure 1:
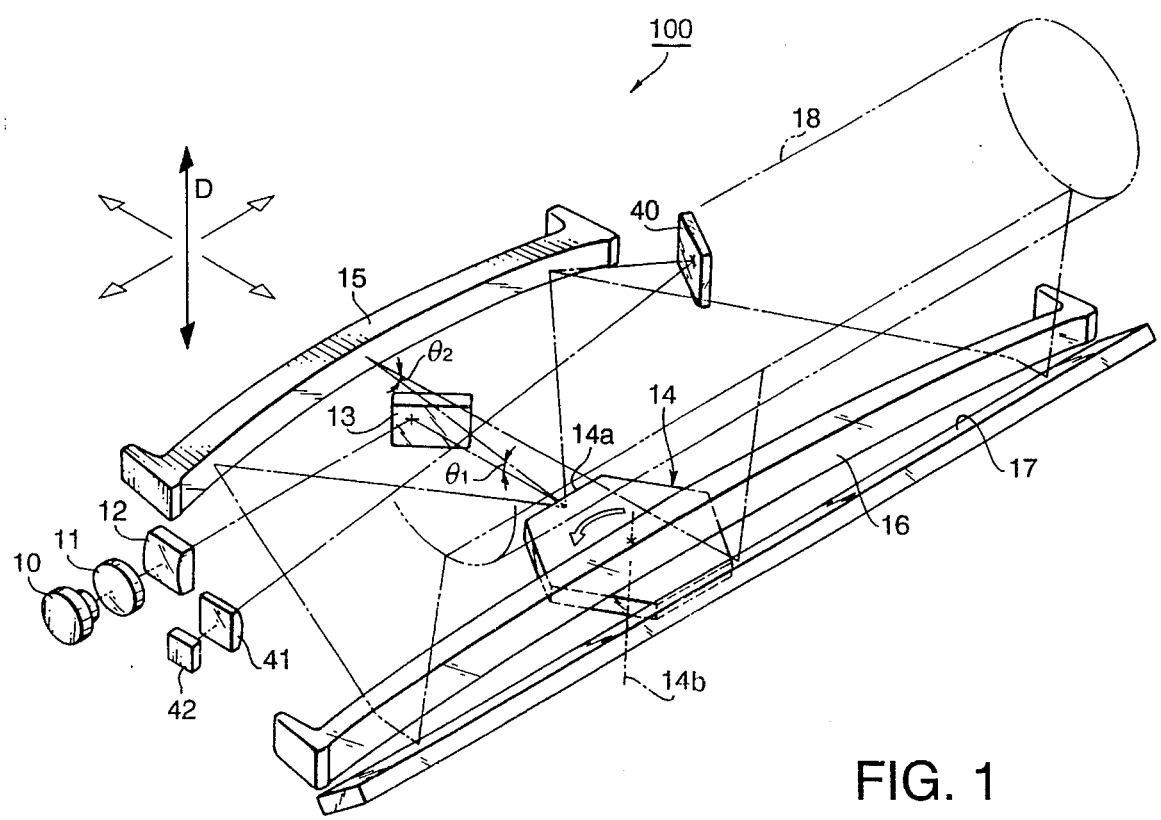
FIG. 1 is a simplified perspective view of an optical system as applied in an embodiment of the invention.

Thus, for all of the optical elements in the system, except for an optical path bending mirror 17, the sub-scanning direction is generally in the depth direction (general direction D in FIG. 1) of the system as depicted in FIG. 1. This is hereinafter referred to as the "sub-scanning direction".

The laser beam at the surface of the photoconductive drum is the reference point for the optical power of the optical elements. That is, the power in the main scanning direction means the power contributing to converge or disperse the laser beam in the main scanning direction at the drum. The power in the sub-scanning direction means the power which contributes to converge or disperse the laser beam in the sub-scanning direction at the drum.

As shown in FIG. 1, an embodiment of a optical scanning device 100 according to the invention is arranged such that diverging light generated from a semiconductor laser 10

(laser source) is collimated by means of a collimator 11. The collimated beam then passes through a cylindrical lens 12, which converges the beam in the sub-scanning direction only. The converged beam is then reflected, at a substantially right angle, towards a polygonal mirror 14 by a flat mirror 13.

The polygonal mirror 14 is rotatable at a high speed, turning six reflecting surfaces 14a across the beam, thereby scanning the laser beam in the main scanning direction. The scanning beam is deflected up in the sub-scanning direction by the polygonal mirror 14 at a first separation angle $\theta_1$, and is subsequently again deflected up in the general sub-scanning direction by a curved surface mirror 15 (having positive power in the main scanning direction), and directed to an anamorphic lens 16 above the polygonal mirror 14. The anamorphic lens 16 primarily has power in the sub-scanning direction. The beam is then redirected by an optical path bending mirror 17, and illuminates the photoconductive drum 18 above the optical scanning device 100, scanning in the main scanning direction.

Thus, the laser beam forms an image, once converged in the sub-scanning direction by the cylindrical lens 12, on each reflecting surface 14a of the polygonal mirror 14. The beam then again forms an image on the photoconductive drum 18, again converged by means of the optical power of the anamorphic lens 16 in the sub-scanning direction. This structure prevents displacement of the scanning beam on the photoconductive drum 18 from a tilting error of the reflecting surface 14a.

The flat mirror 13 reflects the laser beam from the cylindrical lens 12 at a substantially right angle towards the rotary axis 14b of the polygonal mirror 14. The laser beam is directed towards the rotary axis 14b of the polygonal mirror 14 to increase the angular range through which scanning is possible. Thus, given any required size of polygonal mirror 14, the scanning range is larger. Conversely, given any required scanning range, the size of the polygonal mirror 14 can be reduced. Furthermore, given this arrangement, optical field curvature occurs symmetrically about the optical axis, so that a field curvature correction is easily accomplished.

Herein, to facilitate explanation, a plane containing the optical axis of the laser beam generated by the semiconductor laser 1, and containing the optical axis of the laser beam reflected by the flat mirror 13 (and incident upon the polygonal mirror 14), is designated as a laser supply plane.

In this embodiment, the polygonal mirror 14 is a flattened hexagonal prism shape and the six lateral faces are reflecting surfaces. The polygonal mirror 14 may be fashioned or developed from metal. The polygonal mirror 14 is rotated by a motor (not shown in FIG. 1) about a rotational axis 14b to scan the laser beam reflected therefrom. The rotational axis 14b of the polygonal mirror 14 is inclined at an angle of ½ of a first separation angle $\theta_1$ from a normal line of the laser supply plane. The inclination of the axis 14b of the polygonal mirror 14 deflects the laser beam at a first separation angle $\theta_1$ from the laser supply plane, in the sub-scanning direction.

The first separation angle $\theta_1$ is set to be as little as possible, but having sufficient separation from the laser supply plane (containing the flat mirror 13 and the beam therefrom) to prevent interference with the flat mirror 13 with the scanning beam. Thus, the curved surface mirror 15 is placed to intercept the incoming beam at the first separation angle $\theta_1$ from the polygonal mirror 14, behind the flat mirror 13 (with reference to the path of the incoming beam).

For the curved surface mirror 15 in this embodiment, a concave mirror is employed. The curved surface mirror 15 is inclined (toward the polygonal mirror 14) by an angle of substantially $(2\theta_1-\theta_2)/2$ from a normal line of the laser supply plane. The inclination of the curved surface mirror 15 directs the scanning beam at a second separation angle $\theta_2$ from the first separation angle $\theta_1$, to the anamorphic lens 16. The second separation angle $\theta_2$ is as little as possible but having sufficient separation from the polygonal mirror 14 to prevent the transmission of oscillations from the rotating polygonal mirror 14 to the anamorphic lens 16. The first separation angle $\theta_1$ may be less than the second separation angle $\theta_2$.

The curved surface mirror 15 is therefore inclined towards the polygonal mirror to reduce the deflection amount in the general sub-scanning direction. Furthermore, as the laser beam is incident to the polygonal mirror 14 with an inclination causing curvature of the scanning lines, by inclining the curved mirror 15 in the direction opposite that of the polygonal mirror 14, a canceling curvature is generated, and the curvatures substantially are canceled out.

The anamorphic lens 16 has different shapes on its incident and exit sides; that is, the sides on which the scanning beam is incident and on which the beam exits. The incident side of the anamorphic lens 16 is convex, aspherical, and rotationally symmetric about the optical axis (having no magnification power). The light exit side of the anamorphic lens 16 is concave, and rotationally asymmetric about the optical axis. The shape of the light exit side is a locus formed from the rotation of a curved, non-arc line about an axis in the main scanning direction. The anamorphic lens 16 has almost no power in the main scanning direction, but has positive power in the sub-scanning direction gradually increasing from the edges (in the main scanning direction) to the center.

As to the sub-scanning direction, the optical axes of both surfaces of the anamorphic lens 16 is offset within the lens body towards the polygonal mirror 14 with respect to the optical axis of the optical system in the sub-scanning direction. By arranging the anamorphic lens 16 to be eccentric, or offset, in the sub-scanning direction, skew distortion, generated as the laser beam is incident on the reflection surfaces of the polygonal mirror 14 at an angle in the sub-scanning direction, is corrected. That is, since the laser beam incident on the anamorphic lens 14 scans in accordance with a locus offset from the revolution axis of the incident surface of the anamorphic lens 16 (coincident with the optical axis of the lens 16), the anamorphic lens 16 bends the laser beam asymmetrically about the optical axis in the sub-scanning direction. With this function, the skew distortion of the laser beam can be corrected. In this embodiment, as the optical axis is offset from the scanning locus, the anamorphic lens 14 is reduced in size in the sub-scanning direction on the side of the optical axis away from the scanning locus, as this portion of the lens 14 is not used. That is, the anamorphic lens 14 is formed to be of substantially equal height in the sub-scanning direction on either side of the incident scanning locus, although the optical axis is displaced toward the polygonal mirror 14 in the same direction.

A flat mirror 40 is placed between the anamorphic lens 16 and the curved surface mirror 15, just out of the scanning range used for printing, and opposing the curved surface mirror 15, at a predetermined position corresponding to the end of the scanning range. When the laser beam reflected by the curved surface mirror 15 reaches the end of the scanning range, the laser beam is reflected by the flat mirror 40 to a light sensor 42, first passing through a cylindrical lens 41 having positive power only in the sub-scanning direction. The light sensor 42 is positioned on the opposite side of the optical scanning device 100, and sends a synchronizing signal to initiate the writing of each main scan in response to each detection of the laser. The laser beam reflected by the curved surface mirror 15 is converged in the main scanning direction, but dispersed in the sub-scanning direction over the longer optical path to the detector 42, so it is reconverged at the lens 41 in the sub-scanning direction to form a spot on the light sensor 42. In case the laser beam is displaced in the sub-scanning direction, the correction function of the lens 41 leads the laser beam to the light sensor 42.

Figure 2:
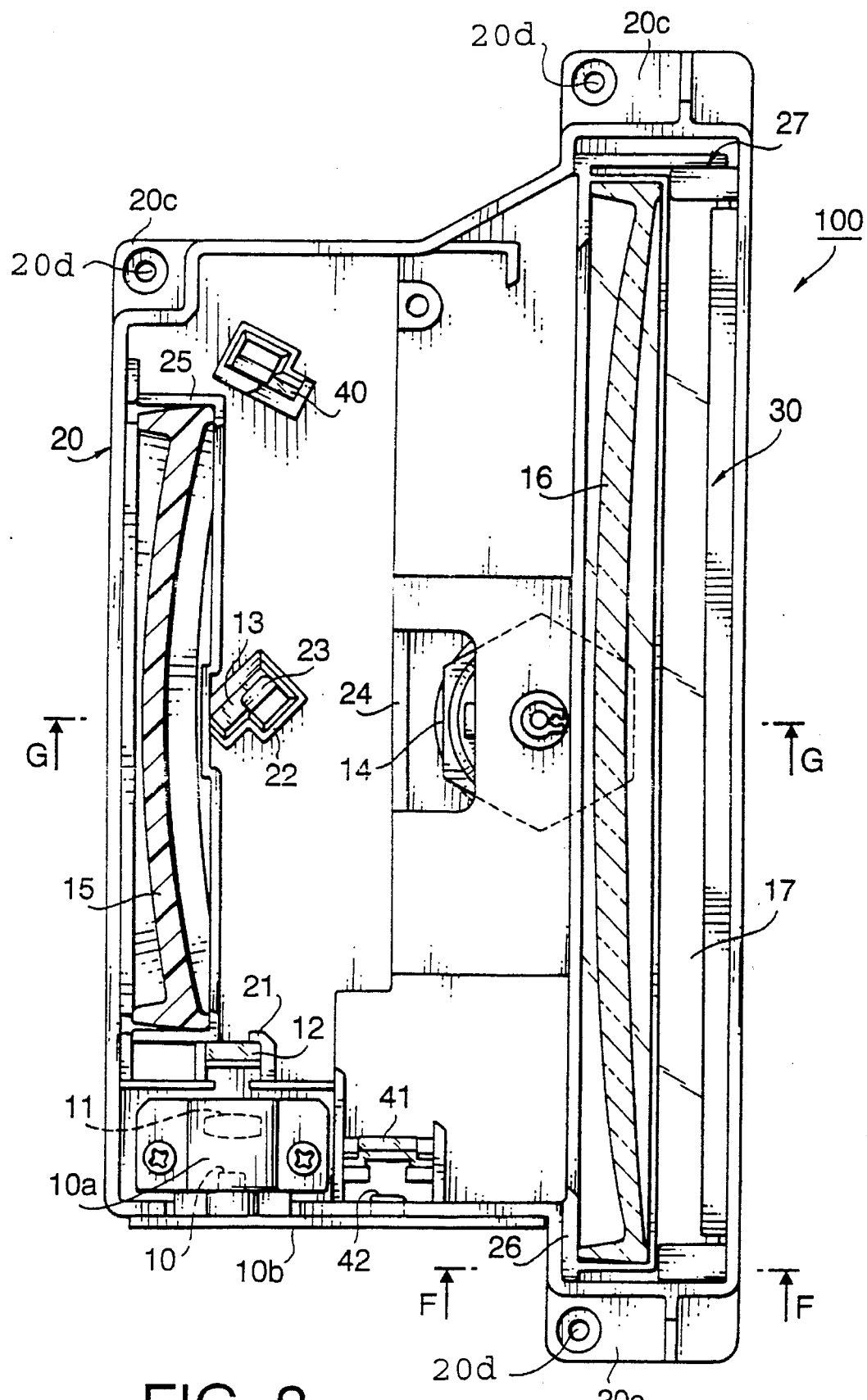
FIG. 2 is a plan view of an optical scanning device as applied in an embodiment of the invention.
Figure 3:
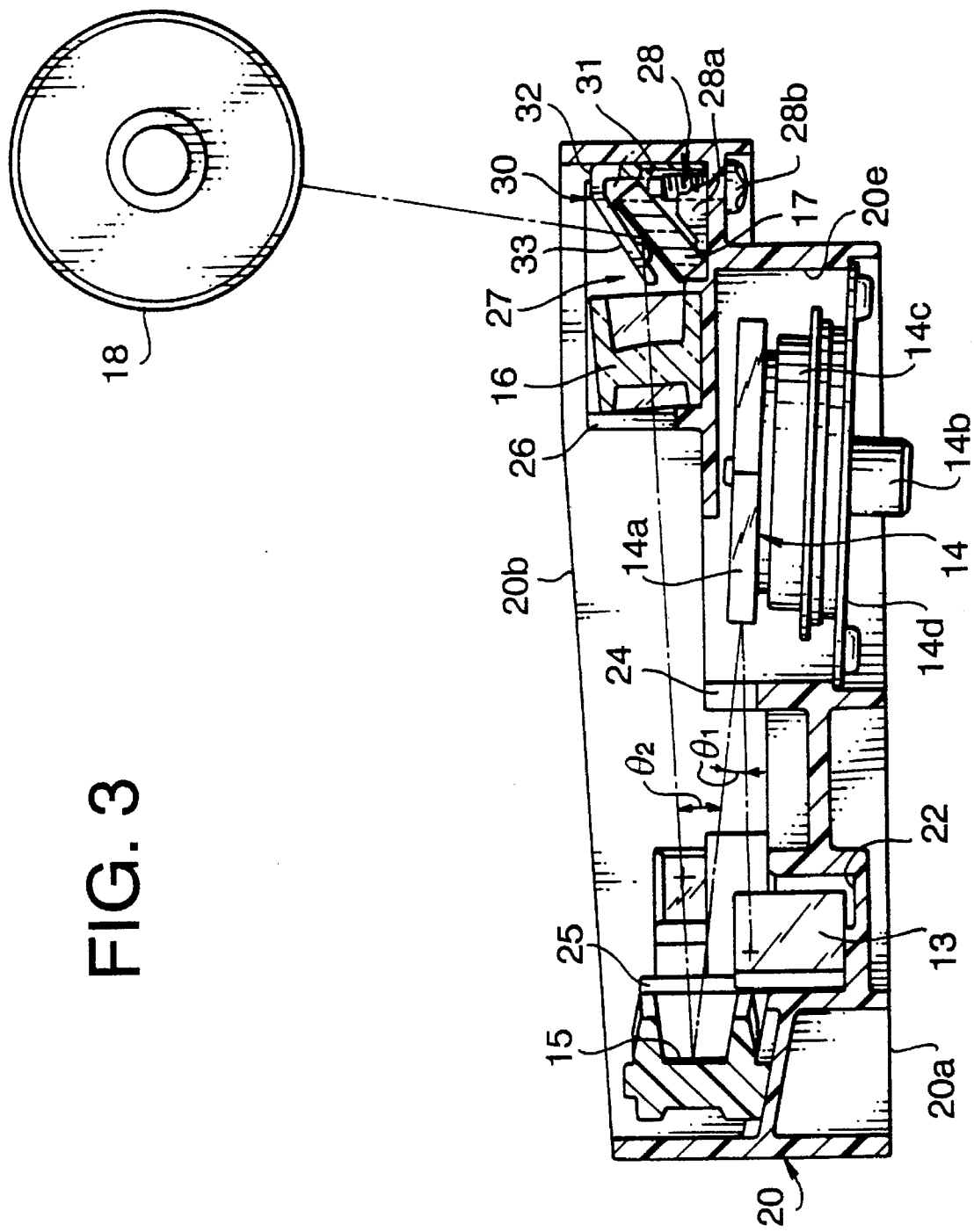
FIG. 3 is a side sectional view of the optical scanning device, taken along the line G—G of FIG. 2.

FIGS. 2 and 3 show an example of actual assembly of the device. Among the above-described optical elements, elements having aspherical surfaces (i.e. the cylindrical lenses 12, 41, the curved surface mirror 15, and the anamorphic lens 16) are formed from resin plastic, and the flat elements (i.e., flat mirrors 13, 40, and the optical path bending mirror 17) are formed by coating a reflective metal layer on one surface of a glass planar element. The front reflective layer of the optical path bending mirror 17 is identified as the front mirror surface, and the opposite surface is identified as the back surface.

A housing 20, formed from resin plastic, holds the optical elements. The housing 20 is formed with reference to a mounting plane; that is, the optical scanning device is mounted in a laser beam printer or other apparatus with reference to the mounting plane, and the size of the housing in a direction normal to the mounting plane defines the thickness of the housing. A direction substantially normal to the mounting plane is the sub-scanning direction in this case. In this embodiment, a mounting surface 20a, and at least three mounting tabs 20c (each having a mounting hole 20d), are all parallel to the mounting plane.

In this embodiment, the flat mirror 13 is secured in the housing at a very small angle, such that the laser supply plane (including the central axis of the laser beam reaching the polygonal mirror 14 from the semiconductor laser 10) is very slightly inclined with respect to the mounting plane; thus, the laser beam incident on the polygonal mirror 14 is substantially parallel to the bottom surface 20a and the mounting tabs 20c of the housing 20. In the description of relationships between angles, the laser supply plane and mounting plane can be used interchangeably, as the small angle difference does not substantially change the function of the angular relationships between optical elements of the device. The flat mirror 13 and polygonal mirror 14 unit have some size in the sub-scanning direction, and the small angle relationship between the laser supply plane and the mounting plane is permitted by the accommodation of the elements in the housing 20. In this embodiment, for example, the angle between the laser supply plane and the mounting plane is 1 degree, set by inclining the flat mirror by ½ degree.

The semiconductor laser 10 and the collimator 11 are held as a unit within the laser supply plane in a metal subframe 10a, and the subframe 10a is screwed to the housing 20. A circuit board 10b bearing components for driving the semiconductor laser 10 and the light sensor 42 is mounted outside the housing 20 in the vicinity of the subframe 10a. The cylindrical lens 12 is arranged in the laser supply plane such that the cylindrical surface thereof faces the semiconductor laser 10. The cylindrical lens 12 is fixed to the housing 20 with a flat surface side thereof abutting a lens locating portion 21 formed in the housing 20. Another cylindrical lens 41, having positive power in the sub-scanning direction, is secured to the housing 20 in front of the light sensor 42. The flat mirror 13 is held in a mirror mounting portion 22 having two positioning beads for positioning the mirror formed on the back surface of thereof. The mirror 13 is secured to the mounting portion 22 by means of a metal leaf spring 23 pressed between the mirror 13 and the mounting portion 22.

The polygonal mirror 14 is mounted to the rotational axis 14b of a scanner motor 14c, and the scanner motor 14c is fixed to a motor base plate 14d. The rotational axis 14b is normal to the base plate 14d, which bears a driving circuit. A cavity in the housing 20 including a base plate mounting surface 20e, inclined from the mounting plane substantially at the aforementioned angle $\theta_1/2$, holds the base plate 14d. The base plate 14d is screwed onto the outer housing 20 from the lower side of FIG. 3. An opening 24 is formed in a side of the cavity in the housing 20, exposing a portion of the polygonal mirror 14 to the interior of the housing 20. The incident laser beam from the flat mirror 13 strikes the polygonal mirror 14 via the opening 24, and the reflected beam directed towards the curved mirror 15 also passes through the opening 24.

The optical path bending mirror 17 is secured to a mirror mount 27 of the housing 20 by means of a mirror fastener 30. An adjusting portion 28, for adjusting the angle of the optical path bending mirror 17, is provided on one end side of the mirror mount 27.

The adjusting portion 28 includes a stepped portion 28a integral with the housing 20. An adjusting screw 28b screwed from the lower side of the housing 20, and protrudes above the stepped portion 28a to abut the optical path bending mirror 17. By adjusting the screw 28b, the height of the point of the screw changes, pushing up the back surface of the optical path bending mirror 17, and the angle of the optical path bending mirror 17 can be minutely adjusted.

Figure 4:
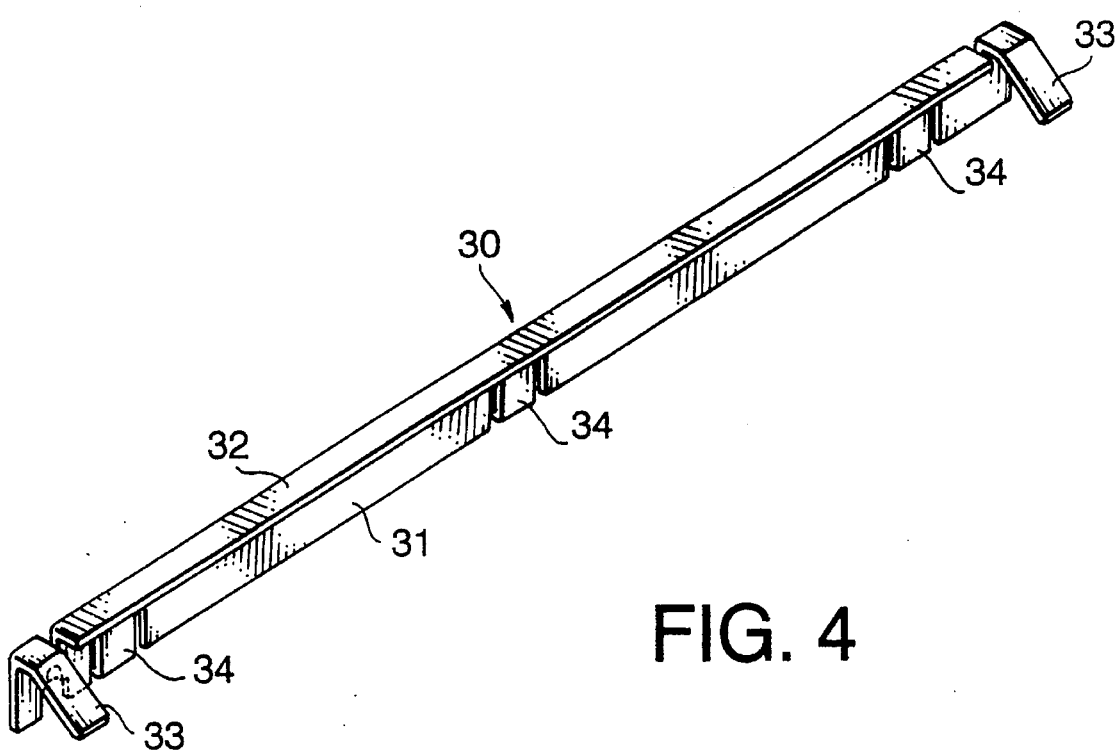
FIG. 4 is a perspective view of an optical path bending mirror fastener according to an embodiment of the invention.
Figure 5A:
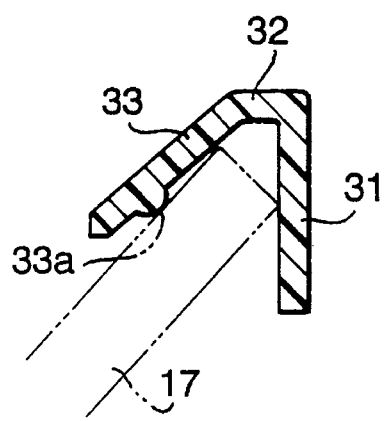
FIG. 5(a) is a side sectional view of the mirror fastener, taken along the line G—G of FIG. 2.

As shown in FIGS. 3 and 4, a mirror fastener 30 is insertable to fasten the mirror. The mirror fastener 30 includes a rear wall 31, against which the back surface of the optical path bending mirror 17 rests, and an upper wall 32, forming an L shaped section. Two resilient retaining arm portions 33 are positioned at opposite longitudinal ends in the main scanning direction, for holding the front mirror surface of the optical path bending mirror. The arm portions 33 are formed to have a V shaped section in combination with the rear wall 31 in order to retain the mirror 17. As shown in FIG. 5(a), hemispherical protrusions 33a may be formed on the inner surface of each of the arm portions 33 to point contact the front mirror surface of the mirror 17.

Figure 5B:
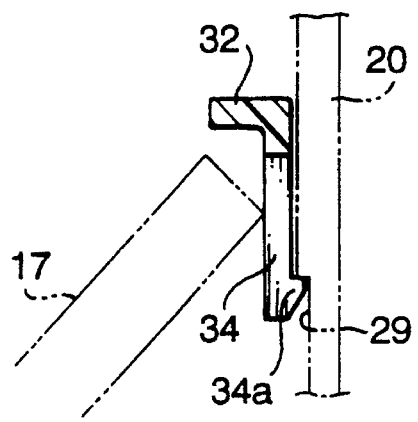
FIG. 5(b) is a side sectional view of the mirror fastener, taken along the line F—F of FIG. 2.

Three engaging portions 34 for fastening the mirror fastener 30 to the housing 20 are formed along the rear wall 31. The three engaging portions 34 are generally coplanar with the rear wall 31, and are swingable or deformable with respect to the rear wall 31. As illustrated in FIG. 5B, a hook 34a may be formed on each of the engaging portions 34, extending in the direction of the facing wall of the housing 20, for engaging respective slots 29 formed at the facing wall of the mirror mounting portion 27 of the housing 20. The slots 29 and hooks 34a retain the fastener 30 and mirror 17 to the housing 20.

At assembly, the optical path bending mirror 17 is set in the mirror mounting portion 27 abutting stepped portions 28a. Thereafter, the mirror fastener 30 is press-inserted from the upper side behind the mirror 17 so that the back surface of the mirror 17 abuts the rear wall 31. The fastener is set to engage the hooks 34a to the slots 29 of the housing 20. The mirror 17 is thereby secured to the housing 20, and held rigidly at the bottom by the mounting portion 27 and stepped portions 28a, at the back surface by the rear wall 31 and resiliently from the front mirror surface by the arm portions 33.

Particularly, by arranging the optical elements such that the reflection point (the actively reflecting surface of the six reflecting surfaces 14a) from the polygonal mirror 14 is placed between the anamorphic lens 16 and the curved surface mirror 15, the size of the housing 20 may be reduced in the "main axis" direction along which the optical elements are generally lined up (i.e., the direction of the optical axes in the center of the scanning sweep from the polygonal mirror 14 to the anamorphic lens 16). Preferably, the laser 10 is also placed between the anamorphic lens 16 and the curved surface mirror 15.

Similarly, by bending the optical path from the laser 10 to the polygonal mirror 14 parallel to the mounting plane using a flat mirror 13, the size of the housing 20 may be reduced in the "main axis" direction.

Further, the scanning optical path length between the polygonal mirror 14 and the anamorphic lens 16 must remain relatively fixed, in order to achieve the appropriate scan sweep at the drum 18 without introducing undue distortion. When the optical path from the laser 10 to the polygonal mirror 14 is bent parallel to the mounting plane using the flat mirror 13 to place the laser to the side of the space between the polygonal mirror 14 and curved surface mirror 15 as noted above, the size of the housing 20 in the "main axis" direction is therefore limited by the longest portion of that scanning optical path. Furthermore, by distributing the portions of the scanning optical path between the polygonal mirror 14 and the anamorphic lens 16 (i.e., the portions between the polygonal mirror 14 and curved surface mirror 15, and between the curved surface mirror 15 and lens 16), the size of the housing 20 may be reduced in the same direction. As the optical path portion between the curved surface mirror 15 and the anamorphic lens 16 more nearly approaches the combined length of the polygonal mirror 14 to curved surface mirror 15 portion and the length (diameter) of the polygonal mirror 14, the closer the length of the necessary housing 20 in the "main axis" direction approaches a minimum length. This balancing can be achieved by placing the reflection point of the surface 14a between the curved surface mirror 15 and the anamorphic lens 16 in the "main axis" direction.

The present disclosure relates to subject matter contained in Japanese Patent Application No. HEI 06-287387, filed on Oct. 27, 1994, which is expressly incorporated herein by reference in its entirety.

What is claimed is:

1. An optical scanning device comprising:

a laser source for emitting a laser flux;

a first flat mirror for redirecting said laser flux from said laser source;

a rotatable polygonal mirror, for scanning said laser flux redirected by said first flat mirror, said scanning laser flux being separated from said redirected laser flux in a sub-scanning direction by a first separation angle $\theta_1$, said polygonal mirror being separated from said first flat mirror by a first predetermined distance;

a curved surface mirror for reflecting said laser flux scanned by said polygonal mirror, and for converging said laser flux scanned by said polygonal mirror in a main scanning direction, said reflected scanning laser flux being separated from said scanning laser flux in said sub-scanning direction by a second separation angle $\theta_2$, said curved surface mirror being separated from said polygonal mirror by a second predetermined distance that is greater than said first predetermined distance; and an anamorphic lens for converging said reflected scanning laser flux in said sub-scanning direction, said anamorphic lens being separated from said curved mirror by a third predetermined distance that is greater than said first predetermined distance, whereby said laser flux is redirected by said first flat mirror between said polygonal mirror and said curved mirror.

2. The optical scanning device according to claim 1, wherein said third predetermined distance is greater than each of said first and second predetermined distances, whereby said laser flux is received and scanned by said polygonal mirror between said curved mirror and said anamorphic lens.

3. The device according to claim 1, further comprising:

an optical path bending mirror for bending the laser beam having passed through said anamorphic lens toward a scanning object surface.

4. The device according to claim 1, wherein said first separation angle $\theta_1$ is less than said second separation angle $\theta_2$.

5. The device according to claim 1, wherein said first flat mirror is arranged to redirect said laser flux from said laser source toward a rotary axis of said polygonal mirror.

6. The device according to claim 1, wherein said first flat mirror is positioned to direct said laser flux from said light source to be received at a reflecting surface of said polygonal mirror at an angle of substantially ½ of said first separation angle $\theta_1$.

7. The optical scanning device according to claim 1, wherein said first flat mirror is held in a mirror mounting portion having two positioning beads formed on a back surface of said mirror mounting portion.

8. The optical scanning device according to claim 1, further comprising:

a light sensor, provided beside said laser source, for initiating a main scan; and a second flat mirror positioned between said curved surface mirror and said anamorphic lens, and opposing said curved mirror, said second flat mirror reflecting said scanning laser flux to said light sensor at the end of a scanning range of said scanning laser flux.

9. The optical scanning device according to claim 8, wherein said laser source comprises a semiconductor laser and a collimator, said semiconductor laser and said collimator being mounted on a circuit board bearing circuits for driving said semiconductor laser.

10. The optical scanning device according to claim 9, wherein said light sensor is mounted on said circuit board.

11. The optical scanning device according to claim 1, wherein each of a plurality of reflection surfaces of said polygonal mirror is formed to be parallel with a rotary axis of said polygonal mirror.

* * * * *